US012736133B2

(12) United States Patent
Yoshizawa et al.

(10) Patent No.: US 12,736,133 B2
(45) Date of Patent: Sep. 15, 2026

(54) WATERPROOF CASE ASSEMBLY STRUCTURE

(71) Applicant: JVCKENWOOD Corporation, Yokohama (JP)

(72) Inventors: Koichi Yoshizawa, Yokohama (JP); Fumiaki Ono, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 19/026,806

(22) Filed: Jan. 17, 2025

(65) Prior Publication Data

US 2025/0155022 A1 May 15, 2025

Related U.S. Application Data

(63) Continuation of application No. PCT/JP2023/038006, filed on Oct. 20, 2023.

(30) Foreign Application Priority Data

Dec. 20, 2022 (JP) ................................ 2022-203358

(51) Int. Cl.
*F16J 15/06* (2006.01)

(52) U.S. Cl.
CPC .................................. *F16J 15/061* (2013.01)

(58) Field of Classification Search
CPC ............. F16J 15/061; F16J 15/10; H05K 5/02
See application file for complete search history.

(56) References Cited

U.S. PATENT DOCUMENTS 9,951,665 B2 * 4/2018 Salameh ............ F01M 11/0004
2008/0290609 A1 * 11/2008 Seibert .................. F16J 15/061 277/596

(Continued)

FOREIGN PATENT DOCUMENTS

JP 2000-283295 10/2000
JP 2012102790 A * 5/2012 ....... F02M 35/10354

(Continued)

OTHER PUBLICATIONS

International Search Report and Written Opinion for International Application Serial No. PCT/JP2023/038006 mailed Jan. 9, 2024, 9 pages.

*Primary Examiner* — Eugene G Byrd
(74) *Attorney, Agent, or Firm* — Amin, Turocy & Watson, LLP

(57) ABSTRACT

An object is to achieve stable waterproof capabilities and assembly guarantee for sealing. An assembly structure of a waterproof case is a structure in which bosses each provided for a different one of first and second cases being separate are fixed by a screw, while an annular sealing body is sandwiched at a part where the bosses abut against each other. The assembly structure includes: an annular groove which is provided so as to surround the screw on an abutting face of the boss of the first case and with which the sealing body is arranged; a plurality of branch grooves being contiguous with the annular groove and extending outside an annular shape thereof; tongue pieces provided so as to extend outside an annular shape of the sealing body and inserted into the branch grooves; and a pressing member being attached, as a separate element, to the first case and pressing the tongue pieces inside the branch grooves.

7 Claims, 4 Drawing Sheets

(56) References Cited

U.S. PATENT DOCUMENTS

2009/0033111 A1* 2/2009 Hupp .................... F16J 15/106 277/650
2009/0102137 A1* 4/2009 Katayama .............. F16J 15/061 277/594
2009/0127799 A1* 5/2009 Alamond ............... F16J 15/062 277/591
2009/0179388 A1* 7/2009 Uhlenkamp ............ F16L 23/22 277/612
2010/0123292 A1* 5/2010 Seno ...................... F16J 15/125 277/650
2011/0167607 A1* 7/2011 Vidrine ................... B25B 27/16 29/283
2011/0298184 A1* 12/2011 Aurelius ................ F16J 15/064 277/630
2012/0152201 A1* 6/2012 Salameh ............... F16B 5/0664 123/198 E
2014/0175759 A1* 6/2014 Nagata ..................... F16J 15/10 277/641
2016/0090990 A1* 3/2016 Zacharias ............... F04D 19/02 277/641
2016/0377208 A1* 12/2016 Holmes, IV ............ F16L 23/24 277/608
2017/0306884 A1* 10/2017 Tomlinson ....... F02M 35/10078
2020/0141494 A1* 5/2020 Sakaguchi ......... H05K 7/20272
2020/0219737 A1* 7/2020 Seo ................... H01L 21/67126
2020/0269337 A1* 8/2020 Hiyama ................... B23K 3/08
2020/0288591 A1* 9/2020 Hsu ........................ H05K 5/061
2021/0025497 A1* 1/2021 Tsuji ...................... F16J 15/104
2021/0071762 A1* 3/2021 Whiteley ............ F16K 11/0856
2021/0404417 A1* 12/2021 Renault .................. F16J 15/061
2023/0341051 A1* 10/2023 Kishi ..................... F16J 15/061
2023/0392690 A1* 12/2023 Golan .................... F16J 15/064

FOREIGN PATENT DOCUMENTS

JP 2013124684 A * 6/2013 ............. F16J 15/061
JP 2013190096 A * 9/2013 ............. F16J 15/104
JP 2013242025 A * 12/2013 .............. F02F 11/00
JP 2016114076 A * 6/2016
JP 2019039446 A * 3/2019 ........... H01L 21/683
JP 2020118301 A * 8/2020 ............... F16J 15/10

* cited by examiner

11Aa
1
11Ae
11A
2
11Ad
11Ae
4
4
4
2A
2
1
11A
2B
2B
3
4
11 (10)
11C
3A
11A
2
1
11D
1
2
11A
4
4
4
3A
11C
1
11A
2
11A
2
1

WATERPROOF CASE ASSEMBLY STRUCTURE

CROSS-REFERENCE TO RELATED APPLICATIONS

This application is a Continuation of PCT International Application No. PCT/JP2023/038006 filed on Oct. 20, 2023 which claims the benefit of priority from Japanese Patent Application No. 2022-203358 filed on Dec. 20, 2022, the entire contents of both of which are incorporated herein by reference.

BACKGROUND OF THE INVENTION

1. Field of the Invention

Embodiments described herein relate generally to a waterproof case assembly structure.

2. Description of the Related Art

As a conventional example, Japanese Patent Application Laid-open No. 2000-283295 presents a configuration in which an O-ring is fitted into a seal groove formed as a depression along the vicinity of the outer periphery of mating surfaces of a case. The seal groove has formed therewith tongue piece grooves communicating with the outer periphery. The O-ring has tongue pieces formed toward the outside so as to be fitted into the tongue piece grooves.

Aside from the above, when mating parts of cases are fixed by using screws, the screws are inserted into an O-ring being an annular gasket, so that waterproofing is realized in the positions where the heads of the screws are fastened. In this structure, however, because the heads of the screws are in direct contact with the gasket, the fastening of the screws may make the gasket stretch or twisted, which makes the waterproof capabilities unstable. To cope with this situation, another waterproof structure may be conceivable in which, on the inside of abutting cases, boss parts for attaching screws are arranged so as to oppose each other, and an O-ring into which the screws are inserted is sandwiched between abutting faces of the two boss parts. In this conceivable structure, because the heads of the screws are not in contact with the O-ring, it would be possible to achieve stable waterproof capabilities. However, in this conceivable structure, during the operation of placing the O-ring on the abutting face of one of the bosses and subsequently causing the abutting face of the other boss to abut thereon, the O-ring might come out of a proper position thereof, and it would be impossible to visually check this situation. As a result, in this conceivable structure, there would be a possibility that the O-ring might come off the abutting faces, which would lead to a problem where stable waterproof capabilities and assembly guarantee for sealing might be degraded.

SUMMARY OF THE INVENTION

It is an object of the present invention to at least partially solve the problems in the conventional technology.

The above and other objects, features, advantages and technical and industrial significance of this invention will be better understood by reading the following detailed description of presently preferred embodiments of the invention, when considered in connection with the accompanying drawings.

A waterproof case assembly structure apparatus according to the present disclosure in which bosses each provided for a different one of first and second cases being separate are fixed by a screw, while an annular sealing body is sandwiched at a part where the bosses abut against each other, the waterproof case assembly structure comprising:

- an annular groove which is provided so as to surround the screw on an abutting face of the boss of the first case and with which the sealing body is arranged;
- a plurality of branch grooves being contiguous with the annular groove and extending outside an annular shape thereof;
- tongue pieces provided so as to extend outside an annular shape of the sealing body and inserted into the branch grooves; and
- a pressing member being attached, as a separate element, to the first case and pressing the tongue pieces inside the branch grooves.

DETAILED DESCRIPTION OF THE PREFERRED EMBODIMENTS

Exemplary embodiments (hereinafter, "embodiments") to carry out the present disclosure will be explained in detail below, with reference to the accompanying drawings. The present disclosure is not limited by the embodiments described below. Further, the constituent elements of the embodiments described below may include elements that can easily be conceived of by a person skilled in the art, elements that are substantially the same, and elements that are in a so-called equivalent scope. Furthermore, it is also possible to combine, as appropriate, any of the constituent elements disclosed in the embodiments described below.

A waterproof case 10 according to an embodiment may be used, for example, for an electronic mechanism that requires waterproof capabilities.

Figure 1:
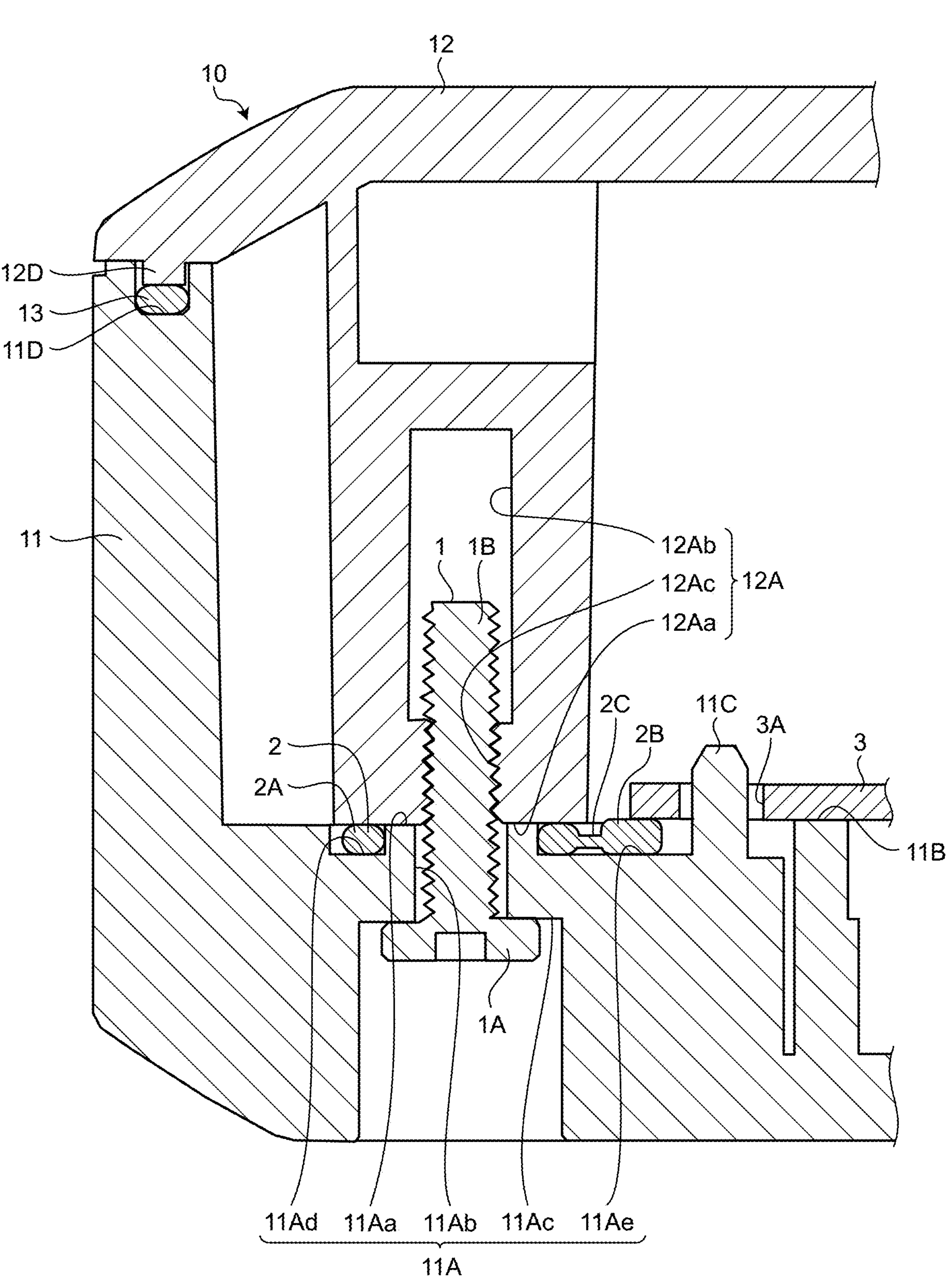
FIG. 1 is a cross-sectional view of a waterproof case assembly structure according to an embodiment.

As illustrated in FIG. 1, the waterproof case 10 is structured with one of separate cases (which may be referred to as a "first case" or a "lower case") 11 and the other case (which may be referred to as a "second case" or an "upper case") 12. The waterproof case 10 is configured to accommodate the electronic mechanism (a substrate in the present embodiment) therein, by causing the first case 11 and the second case 12 to abut against each other so as to be fixed together. The first case 11 has an annular groove part 11D formed along an annular opening edge. The second case 12 has an annular ridge part 12D formed along an annular opening edge. The ridge part 12D is inserted into the groove part 11D. Further, the waterproof case 10 is configured to ensure waterproof capabilities in an abutting part, by arranging an annular gasket 13 such as an O-ring along the groove part 11D and inserting the ridge part 12D into the groove part 11D so that the gasket 13 is pressed thereby, while the first case 11 and the second case 12 abut against each other.

An assembly structure according to the embodiment has a configuration in which, while the first case 11 and the second case 12 of the waterproof case 10 abut against each other, bosses 11A and 12A respectively provided inside the cases 11 and 12 are fixed by screws 1 via annular sealing members 2. With this configuration, the assembly structure according to the embodiment ensures the waterproof capabilities at the abutting part between the first case 11 and the second case 12 described above, while ensuring waterproof capabilities at fixation parts of the screws 1.

The assembly structure includes the bosses 11A 12A, the sealing members 2, and a pressing member 3.

The bosses 12A of the second case 12 are formed so as to protrude toward the interior of the second case 12. Each of the bosses 12A has, at a tip end of a columnar element extending toward the first case 11, a flat abutting face 12Aa. Further, on the inner circumferential surface of a hole 12Ab into which a corresponding one of the screws 1 is inserted while penetrating the abutting face 12Aa, each of the bosses 12A has a screw hole 12Ac provided with a female screw thread into which the corresponding screw 1 is to be twisted. The hole 12Ab is contained inside the case 12 and does not go through to the outside of the case 12.

Figure 3:
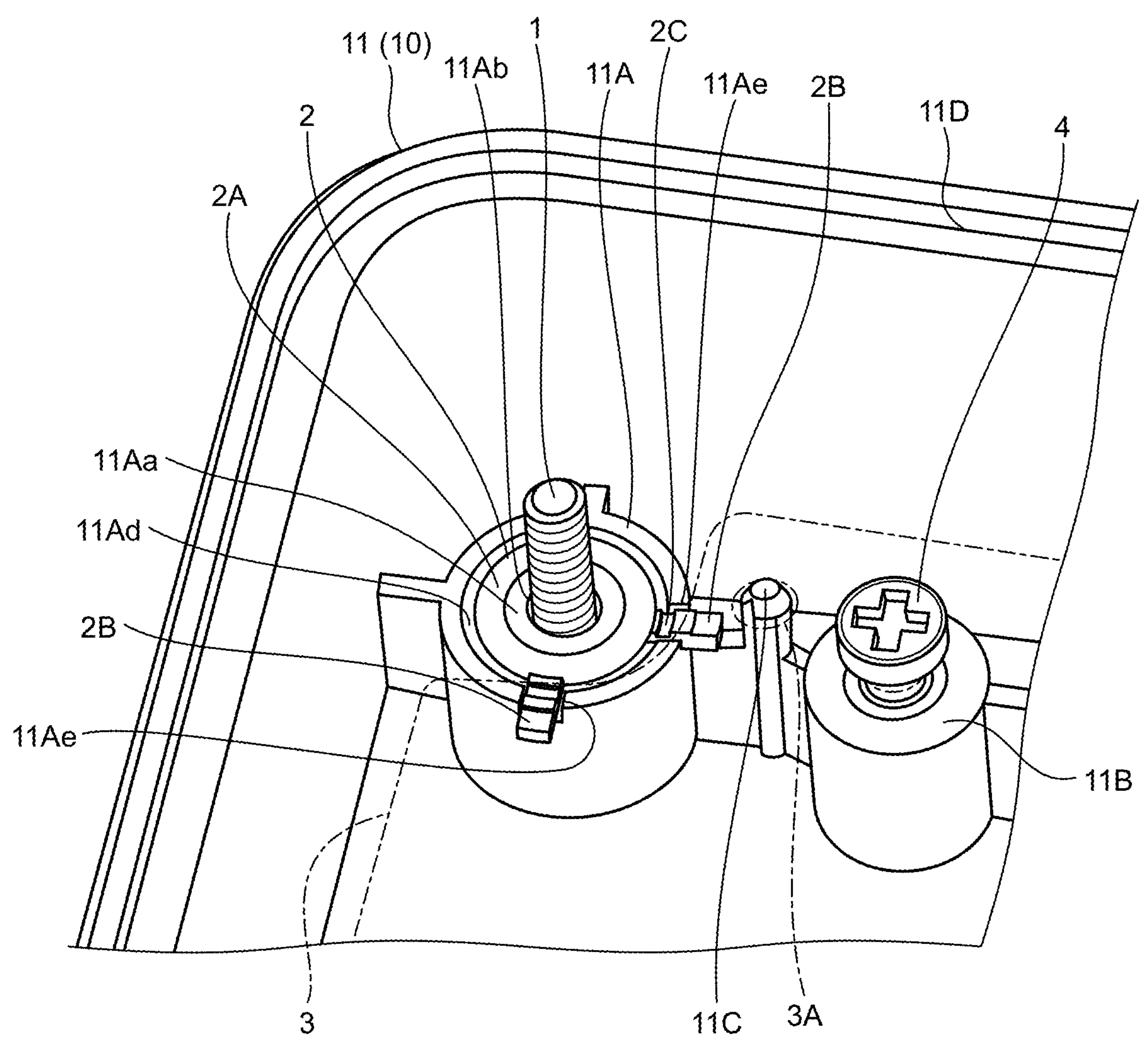
FIG. 3 is an enlarged perspective view of the waterproof case assembly structure according to the embodiment.
Figure 4:
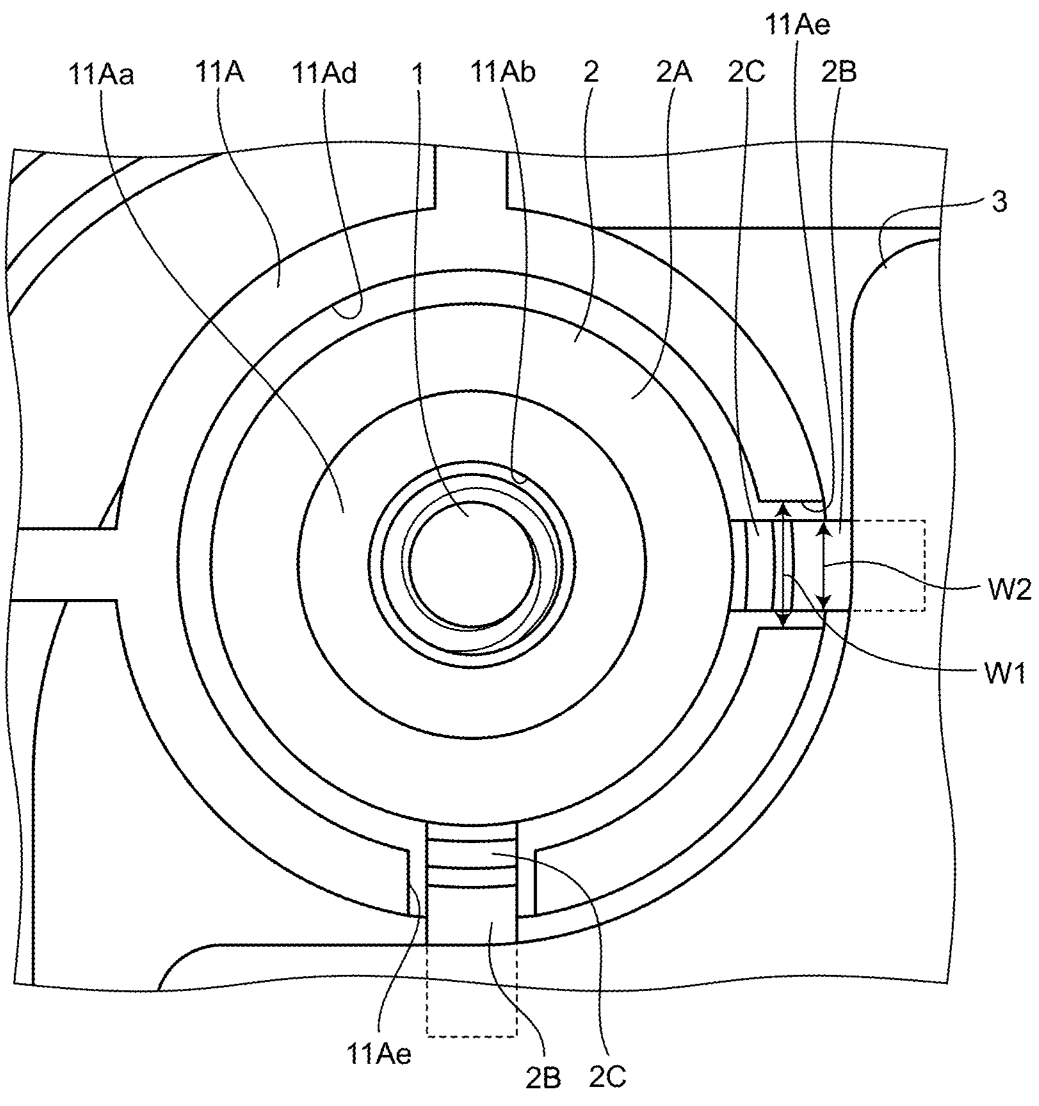
FIG. 4 is an enlarged plan view of the waterproof case assembly structure according to the embodiment.

The bosses 11A of the first case 11 are formed so as to protrude toward the interior of the first case 11. Each of the bosses 11A has a flat abutting face 11Aa that opposes the abutting face 12Aa of a corresponding one of the bosses 12A of the second case 12. Further, each of the bosses 11A has a hole 11Ab that is formed to have a circular shape and that goes through to the outside of the case 11 from the abutting face 11Aa. Also, each of the bosses 11A has an engagement face 11Ac formed around the hole 11Ab on the outside of the case 11. In addition, on the abutting face 11Aa, each of the bosses 11A has an annular groove 11Ad formed to have a circular shape so as to surround the hole 11Ab. Furthermore, each of the bosses 11A has branch grooves 11Ae each being contiguous with the annular groove 11Ad so as to extend to the outside of the annular shape thereof, while going through to the outside of the abutting face 11Aa. The groove bottom of each of the branch grooves 11Ae is formed so as to extend to the outside of the abutting face 11Aa. As illustrated in FIGS. 3 and 4, the plurality of (two in the present embodiment) branch grooves 11Ae are formed so as to extend in mutually-different directions. In the embodiment, the branch grooves 11Ae are formed so as to extend in directions that are mutually different by 90 degrees, with respect to the center of the circular shape of the annular groove 11Ad (the hole 11Ab).

Further, to the first case 11, the pressing member 3 being a plate-like substrate is fixed. The first case 11 has a contact surface 11B provided so as to oppose the second case 12 and to be in contact with one of the plate faces of the pressing member 3. Further, the first case 11 has position determining parts 11C that each have a projection shape to be inserted into a corresponding one of through holes 3A formed in the pressing member 3.

Figure 2:
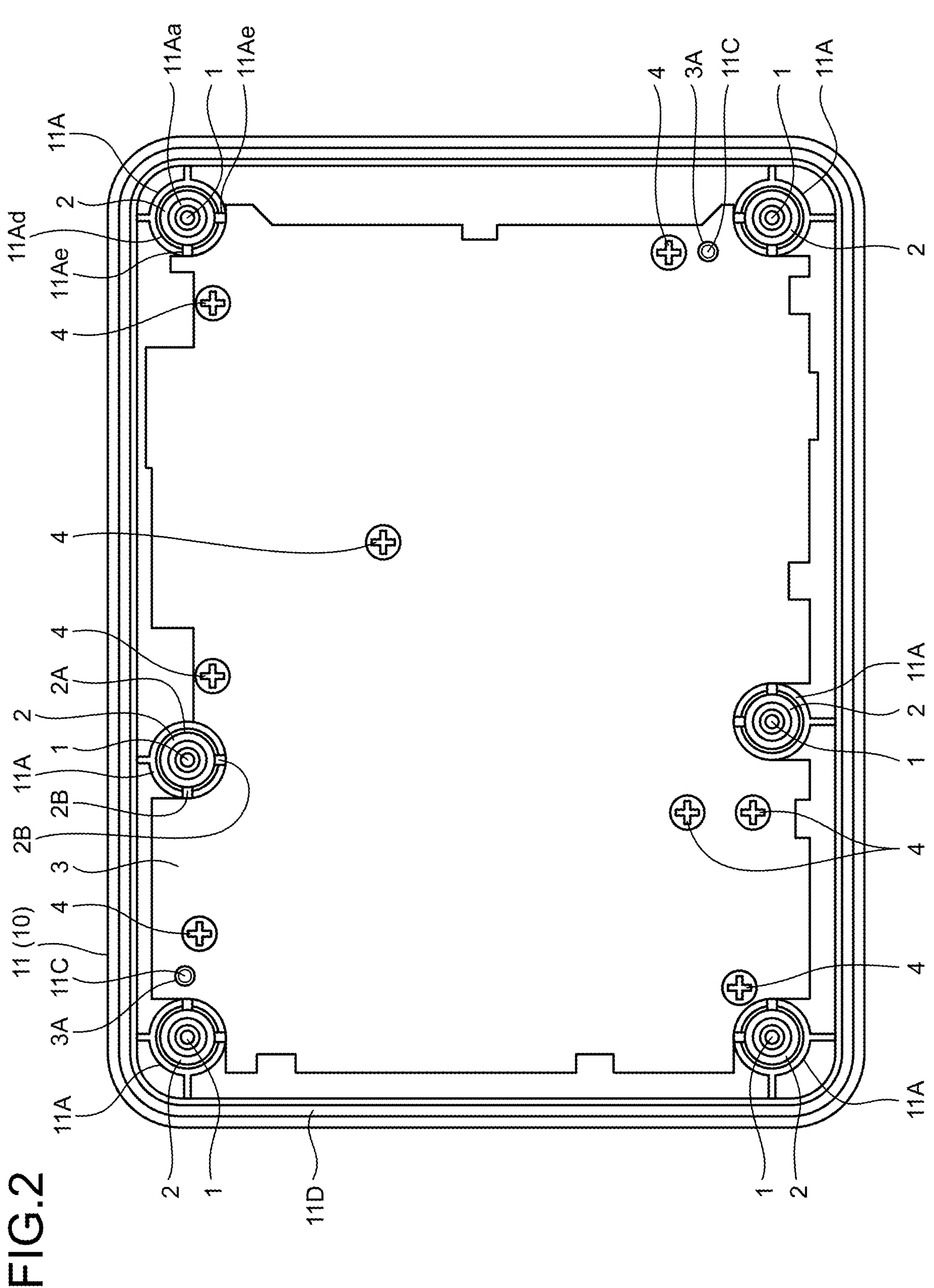
FIG. 2 is a plan view of the waterproof case assembly structure according to the embodiment.

The sealing members 2 are so-called gaskets. The sealing members 2 are formed by using a rubber material or the like. Each of the sealing members 2 includes an annular sealing body 2A formed to have a circular shape so as to be arranged while being inserted in the annular groove 11Ad provided for a corresponding one of the bosses 11A of the first case 11. Each of the sealing bodies 2A may be structured as an O-ring, for example, and has a thickness larger than the depth of the annular groove 11Ad. In other words, each of the sealing bodies 2A is arranged while being inserted in the corresponding annular groove 11Ad, so as to surround the hole 11Ab and to protrude from the abutting face 11Aa toward the abutting face 12Aa of a corresponding one of the bosses 12A. Further, each of the sealing members 2 includes a plurality of tongue pieces 2B provided so as to extend outside the annular shape and to be each inserted into a corresponding one of the branch grooves 11Ae. Similarly to the sealing bodies 2A, the tongue pieces 2B are also formed by using a rubber material or the like and are integrally formed with the corresponding sealing body 2A. As illustrated in FIGS. 2 to 4, the plurality of (two in the present embodiment) tongue pieces 2B are formed so as to extend in mutually-different directions. In the embodiment, the tongue pieces 2B are formed so as to extend in directions that are mutually different by 90 degrees with respect to the center of the circular shape of the corresponding sealing body 2A and so as to be each inserted in a corresponding one of the branch grooves 11Ae. Each of the tongue pieces 2B has a thickness larger than the depth of each of the branch grooves 11Ae. In other words, each of the tongue pieces 2B is inserted in a corresponding one of the branch grooves 11Ae and is arranged so as to extend outside the abutting face 11Aa. Further, as illustrated in FIG. 4, each of the tongue pieces 2B is formed to have a width W2 smaller than a groove width W1 of each of the branch grooves 11Ae. Furthermore, as illustrated in FIG. 1, each of the sealing members 2 includes constriction parts 2C provided between the sealing body 2A and the tongue pieces 2B. The constriction parts 2C are parts formed to be thinner than the sealing body 2A and the tongue pieces 2B. In other words, the constriction parts 2C are deformable to a larger extent than the sealing body 2A and the tongue pieces 2B are.

In the embodiment, the pressing member 3 is structured as the plate-like substrate, as explained above. The pressing member 3 has the through holes 3A into which the position determining parts 11C of the first case 11 are inserted. The pressing member 3 is configured so that the bosses 11A are regulated from moving in the direction opposing the bosses 12A, as a result of the one of the plate faces of the pressing member 3 being in contact with the contact surface 11B of the first case 11. Further, the pressing member 3 is regulated from moving in the directions along the plate faces thereof, as a result of the position determining parts 11C being inserted in the through holes 3A. In addition, as illustrated in FIGS. 2 and 3, the pressing member 3 is fixed while being regulated from moving in the opposing directions of the bosses 11A and 12A, as a result of being brought into contact with the contact surface 11B by screws 4 fastened on the inside of the first case 11 from the other plate face side. In this situation, the pressing member 3 does not necessarily need to be a substrate and may be, for example, a member accommodated in the waterproof case 10 such as a holder member of a mechanism or a plate-like heat sink.

In the assembly structure according to the embodiment configured as described above, the sealing members 2 are arranged with the bosses 11A of the first case 11. More specifically, each of the sealing members 2 is configured so that the sealing body 2A is arranged in the annular groove 11Ad of a corresponding one of the bosses 11A, while the tongue pieces 2B are arranged in the branch grooves 11Ae. Because of having a thickness larger than the depth of the annular groove 11Ad, each of the sealing bodies 2A is arranged so as to exceed the height of the abutting face 11Aa and to jut out of the annular groove 11Ad. Because of each having a thickness larger than the depth of each of the branch grooves 11Ae, the tongue pieces 2B are arranged so as to jut out of the branch grooves 11Ae. The constriction parts 2C of each of the sealing members 2 are each positioned at a certain intermediate point within the part where the annular groove 11Ad and the branch groove 11Ae are contiguous with each other, while each being arranged within the grooves 11Ad and 11Ae. In the assembly structure, the pressing member 3 is subsequently attached to the first case 11. More specifically, the pressing member 3 is fixed to the first case 11 by the screws 4, while being arranged so that the position thereof is determined in such a manner that the position determining parts 11C of the first case 11 are inserted into the through holes 3A. In this situation, the pressing member 3 is arranged so that, while being in the determined position and being fixed, an edge part thereof covers the branch grooves 11Ae from the above. For this reason, while being arranged so as to be in contact with the tongue pieces 2B inserted in the branch grooves 11Ae, the pressing member 3 presses the tongue pieces 2B so as to be arranged inside the branch grooves 11Ae. Accordingly, each of the sealing members 2 is configured so that the sealing body 2A has the position thereof determined and is supported by the annular groove 11Ad via the tongue pieces 2B. Further, although the sealing members 2 are structured so that the tongue pieces 2B are deformed by the pressing of the pressing member 3, because the deformation is absorbed by the constriction parts 2C, the tongue pieces 2B remain in the state of being pressed by the pressing member 3, while no impact of the deformation is imposed on the sealing bodies 2A. The assembly structure is configured so that the first case 11 and the second case 12 are subsequently fastened and fixed by the screws 1, so as to cause the abutting faces 12Aa of the bosses 12A to oppose the abutting faces 11Aa of the bosses 11A. Each of the screws 1 is twisted into the female screw hole 12Ac, while a screw part 1B inserted in the hole 11Ab of a corresponding one of the bosses 11A from the outside of the first case 11 is inserted in the hole 12Ab of a corresponding one of the bosses 12A from the inside of the second case 12. The assembly structure is configured so that the head 1A of each of the fastened screws 1 is in contact with the engagement face 11Ac of a corresponding one of the bosses 11A of the first case 11, so that the abutting faces 11Aa of the bosses 11A of the first case 11 are in contact with the abutting faces 12Aa of the bosses 12A of the second case 12. As a result, the assembly structure is able to ensure the waterproof capabilities of the fixation parts of the screws 1, while the sealing bodies 2A of the sealing members 2 are sandwiched between the bosses 11A and 12A. In the assembly structure, the sealing bodies 2A are deformed when being sandwiched between the bosses 11A and 12A. However, because the sealing bodies 2A are inserted in the annular grooves 11Ad and because the tongue pieces 2B are pressed by the pressing member 3, the sealing bodies 2A maintain the state of being arranged between the bosses 11A and 12. Consequently, the assembly structure is able to properly ensure the waterproof capabilities of the fixation parts of the screws 1. In addition, due to the presence of the constriction parts 2C in the parts where the tongue pieces 2B are provided, the assembly structure is able to achieve proper waterproof capabilities, because it is possible to cause the deformation uniformly over the entire annular shape of each of the sealing bodies 2A regardless of where the tongue pieces 2B are provided. Furthermore, as a result of the fastening of the screws 1, the gasket 13 is sandwiched in the abutting parts of the cases 11 and 12, and the waterproof case 10 is therefore able to also ensure waterproof capabilities in the abutting parts via the gasket 13.

As explained above, the assembly structure of the waterproof case 10 according to the embodiment is a structure in which the bosses 11A and 12A respectively provided for the first and the second cases 11, 12 being separate are fixed by the screws 1, while the annular sealing bodies 2A are sandwiched at the parts where the bosses 11A and 12A abut against each other. Further, the assembly structure includes: the annular groove 11Ad which is provided so as to surround each of the screws 1 on the abutting face 11Aa of a corresponding one of the bosses 11A of the first case 11 and with which a corresponding one of the sealing bodies 2A is arranged; the plurality of branch grooves 11Ae being contiguous with the annular groove 11Ad and extending outside the annular shapes thereof; the tongue pieces 2B provided so as to extend outside the annular shape of each of the sealing bodies 2A and inserted into the branch grooves 11Ae; and the pressing member 3 being attached, as a separate element, to the first case 11 and pressing the tongue pieces 2B inside the branch grooves 11Ae.

With the assembly structure of the waterproof case 10 described above, because each of the sealing bodies 2A is sandwiched between the bosses 11A and 12A that abut against each other and that are respectively provided for the first and the second cases 11, 12 being separate, it is possible to enhance the waterproof capabilities. In addition, in the assembly structure of the waterproof case 10 described above, because the tongue pieces 2B are pressed by the pressing member 3, it is possible to support the sealing bodies 2A in proper positions such that waterproof capabilities are achieved between the bosses 11A and 12A provided for the first case 11 and the second case 12. As a result, the assembly structure of the waterproof case 10 described above is able to achieve the stable waterproof capabilities and the assembly guarantee for the sealing. Furthermore, in the assembly structure of the waterproof case 10 described above, by ensuring that the plurality of tongue pieces 2B are pressed by the pressing member 3, it is possible to support each of the sealing bodies 2A in multiple places and to provide sufficient support, as compared to the situation where single tongue pieces 2B are pressed by the pressing member 3. For this reason, it is possible to prevent the sealing bodies 2A from falling, at the time of assembling the first case 11 and the second case 12 together after the sealing bodies 2A are placed or at the time of performing an operation to change the orientation of the first case 11 after the sealing bodies 2A are placed. Consequently, the assembly structure of the waterproof case 10 described above is able to achieve the stable waterproof capabilities and the assembly guarantee for the sealing.

Further, in the assembly structure of the waterproof case 10 according to the embodiment, the plurality of branch grooves 11Ae are provided so as to extend in the mutually-different directions, while the plurality of pieces of tongue pieces 2B are provided so as to extend in the mutually-different directions and to be inserted into the branch grooves 11Ae.

In the assembly structure of the waterproof case 10 described above, because the sealing bodies 2A are supported from mutually-different directions as a result of the pressing member 3 pressing the plurality of tongue pieces 2B extending in the mutually-different directions, it is possible to prevent, without fail, the sealing bodies 2A from coming out of the proper positions thereof. More specifically, in the assembly structure according to the embodiment, the tongue pieces 2B are formed so as to extend in the directions that are mutually different by 90 degrees, with respect to the center of the circular shape of each of the sealing bodies 2A. With this configuration, as illustrated in FIGS. 2 and 3, without the need to design the pressing member 3 so as to have a complicated shape that surrounds the bosses 11A (the bosses 12A) in an oversized manner, it is possible to keep the structure compact even when any of the bosses 11A (the bosses 12A) is positioned in the vicinity of a corner part of the case 11 (12) and to ensure that the configuration to support the sealing bodies 2A is provided without causing hindrance.

Further, in the assembly structure of the waterproof case 10 according to the embodiment, the dimension of the width W2 of each of the tongue pieces 2B is smaller than the groove width W1 of each of the branch grooves 11Ae.

In the assembly structure of the waterproof case 10 described above, because there is a gap between the tongue pieces 2B and groove walls of the branch grooves 11Ae, it is possible to easily arrange the tongue pieces 2B in the branch grooves 11Ae. For example, if the width W2 of each of the tongue pieces 2B were larger than the groove width W1 of each of the branch groove 11Ae, because it would be necessary to press and insert the tongue pieces 2B into the branch grooves 11Ae, the pressing of the pressing member 3 might be unstable, and it might not be possible, in some situations, to properly arrange the tongue pieces 2B into the branch grooves 11Ae.

Further, in the assembly structure of the waterproof case 10 according to the embodiment, the first case 11 has formed therewith the plurality of the annular grooves 11Ad, while the single pressing member 3 presses the tongue pieces 2B provided for the plurality of sealing bodies 2A and arranged in the plurality of annular grooves 11Ad. In other words, in the assembly structure of the waterproof case 10 according to the embodiment, the plurality of tongue pieces 2B are pressed by the single pressing member 3.

In the assembly structure of the waterproof case 10 described above, because the single pressing member 3 presses the tongue pieces 2B provided for the plurality of sealing bodies 2A and arranged in the plurality of annular grooves 11Ad, it is possible to collectively press the tongue pieces 2B of the plurality of sealing bodies 2A.

Further, the assembly structure of the waterproof case 10 according to the embodiment further includes the position determining parts 11C that determine the position of the pressing member 3 to be such positions that the tongue pieces 2B are pressed inside the branch grooves 11Ae.

In the assembly structure of the waterproof case 10 described above, because the position of the pressing member 3 is supported by the position determining parts 11C, it is possible to properly press the tongue pieces 2B inside the branch grooves 11Ae, and it is therefore possible to arrange the sealing bodies 2A in the proper positions.

Further, in the assembly structure of the waterproof case 10 according to the embodiment, the pressing member 3 is structured by using the substrate attached to the first case 11.

In the assembly structure of the waterproof case 10 described above, by using the substrate as the pressing member 3, it is possible to conveniently make dual use of the member accommodated in the waterproof case 10, and it is therefore possible to avoid increasing the number of component parts and to prevent the configuration from becoming complicated and costs from increasing.

The present embodiments may include the following features:

According to the present disclosure, it is possible to achieve stable waterproof capabilities and the assembly guarantee for the sealing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A waterproof case assembly structure in which bosses each provided for a different one of first and second cases being separate are fixed by a screw, while an annular sealing body is sandwiched at a part where the respective bosses of the first and second cases abut against each other, the waterproof case assembly structure comprising:

an annular groove;
- which is provided so as to surround the screw on an abutting face of the boss of the first case, and
- with which the sealing body is arranged;

a plurality of branch grooves:
- being contiguous with the annular groove, and
- extending outside an annular shape thereof;

tongue pieces provided so as to:
- extend outside an annular shape of the sealing body, and
- be inserted into the branch grooves;

a pressing member:
- being attached, as a separate element, to the first case, and
- pressing the tongue pieces inside the branch grooves; and a position determining part that determines a position of the pressing member to be such a position that the tongue pieces are pressed inside the branch grooves.

2. The waterproof case assembly structure according to claim 1, wherein the plurality of branch grooves are provided so as to extend in mutually-different directions, and wherein the plurality of tongue pieces are further provided so as to;

extend in mutually-different directions, and be inserted in the branch grooves.

3. The waterproof case assembly structure according to claim 2, wherein the plurality of tongue pieces are pressed by the single pressing member.

4. The waterproof case assembly structure according to claim 1, wherein a width dimension of each of the tongue pieces is smaller than a groove width of each of the branch grooves.

5. The waterproof case assembly structure according to claim 1, wherein a constriction part is provided at a basal part of each of the tongue pieces.

6. The waterproof case assembly structure according to claim 1, wherein the first case has formed therewith a plurality of annular grooves comprising the annular groove, and wherein the single pressing member presses the tongue pieces provided for a plurality of sealing bodies that:

comprise the sealing body, and are arranged in the plurality of annular grooves.

7. The waterproof case assembly structure according to claim 1, wherein the pressing member is structured by using a substrate attached to the first case.

* * * * *